(12) United States Patent
Shimizu

(10) Patent No.: US 6,671,734 B1
(45) Date of Patent: Dec. 30, 2003

(54) IP FRAGMENT-PROCESSING APPARATUS, METHOD AND COMPUTER PROGRAM

(75) Inventor: Eiichi Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 630 days.

(21) Appl. No.: 09/664,726

(22) Filed: Sep. 19, 2000

(30) Foreign Application Priority Data

Nov. 16, 1999 (JP) .......................................... 11-325719

(51) Int. Cl.[7] .............................................. G06F 13/00
(52) U.S. Cl. ..................................................... 709/236
(58) Field of Search ................... 709/236, 246; 714/807

(56) References Cited

U.S. PATENT DOCUMENTS 5,815,516 A * 9/1998 Aaker et al. ................ 714/807
6,453,357 B1 * 9/2002 Crow et al. ................. 709/236

* cited by examiner

*Primary Examiner*—Robert B Harrell
(74) *Attorney, Agent, or Firm*—Young & Thompson

(57) ABSTRACT

An R1 register 101 receives predetermined data of the IP header of an original IP packet, an R2 register receives the predetermined data of the IP header obtained by fragment-processing a packet obtained by dividing the original IP packet, and an R3 register receives portions of the IP header of the original IP packet. An arithmetic circuit 104 subtracts values in the R2 register 102 from a value in the R1 register 101. An arithmetic circuit 105 subtracts a predetermined value from one of the values in the R3 register 103 and recalculates another value in the R3 register 103 corresponding to a change of said one of the value. An arithmetic circuit 106 generates a new value by adding a result of arithmetic operation of the arithmetic circuit 104 and the recalculated value obtained by the arithmetic circuit 105 to each other, and introduces this result into the R3 register 103 or another register.

16 Claims, 3 Drawing Sheets

IP FRAGMENT-PROCESSING APPARATUS, METHOD AND COMPUTER PROGRAM

BACKGROUND OF THE INVENTION

1. Field of the Invention

The present invention relates to an IP (Internet protocol) fragment-processing apparatus and a method for processing the IP header of an IP packet, and a recording medium storing in it a program for performing the method.

2. Description of Related Art

An IP packet is sent together with an IP header having a checksum field of 16 bits in length in order to ensure the integrity of data.

FIG. 3 shows the format of an IP packet. The IP header is composed of the respective values of VER to DEST of FIG. 3 and has a data portion following them.

A method for calculating a checksum, which considers an IP header as a row of 16-bit words, performs addition on each word by means of ones-complement operation and further adds a carry and finally takes the ones complement of the result. This header checksum calculation is performed by built-in software of a router apparatus or the like.

In case of sending an IP packet, when the size of a packet capable of being transmitted by a network at the reception side is smaller than the size of a packet capable of being transmitted by a network at the transmission side, that IP packet is divided into a plurality of smaller packets before sending to the reception side. At this time, it is necessary to perform an IP fragmentation process for changing each value of the IP header of each smaller packet resulting from the division.

When an IP fragmentation process is performed, since the respective values of the TL (Total Length), OF (Fragment Offset), TTL (Time To Live) and HC (Header Checksum) fields are changed and the value of the FL (Flag) field can be also changed, these values need to be recalculated. Up to now, there has been a problem in that the number of steps for this recalculation increases the complexity of the associated software.

SUMMARY OF THE INVENTION

The present invention has been made in order to solve the above-mentioned problem, and aims at making it possible to process with one software instruction the checksum recalculation process of an IP header to be performed in an IP fragmentation process.

In order to attain the above-mentioned object, an IP fragment-processing apparatus according to the present invention is provided with a first register which receives a first portion of an IP header of an original IP packet, a second register which receives second portions of an IP header of a smaller packet which is obtained by dividing the original IP packet, a third register which receives third and fourth portions of the IP header of the original IP packet, a first arithmetic unit which subtracts the values of the second portions from the first portion, a second arithmetic unit which subtracts a predetermined value from the third portion and recalculates the value of the fourth portion corresponding to a change of the third portion, and a third arithmetic unit which generates a new fourth portion by adding a result of an arithmetic operation of the first arithmetic unit and the fourth portion obtained by the second arithmetic unit.

In the IP fragment-processing apparatus, the new fourth portion obtained by the third arithmetic unit may be intro- duced in the third register or may be introduced in a fourth register other than the third register. The IP fragment-processing method is performed by operating the above-described apparatus, and the recording medium according to the invention has stored therein computer-readable code instructing a general purpose computer to perform the method according to the invention, and to configure itself as the inventive apparatus.

BRIEF DESCRIPTION OF THE DRAWINGS

The above and other objects, features and advantages of the present invention will become more apparent upon a reading of a following detailed description taken in conjunction with the accompanying drawings, in which.

DESCRIPTION OF THE PREFERRED EMBODIMENT

Figure 1:
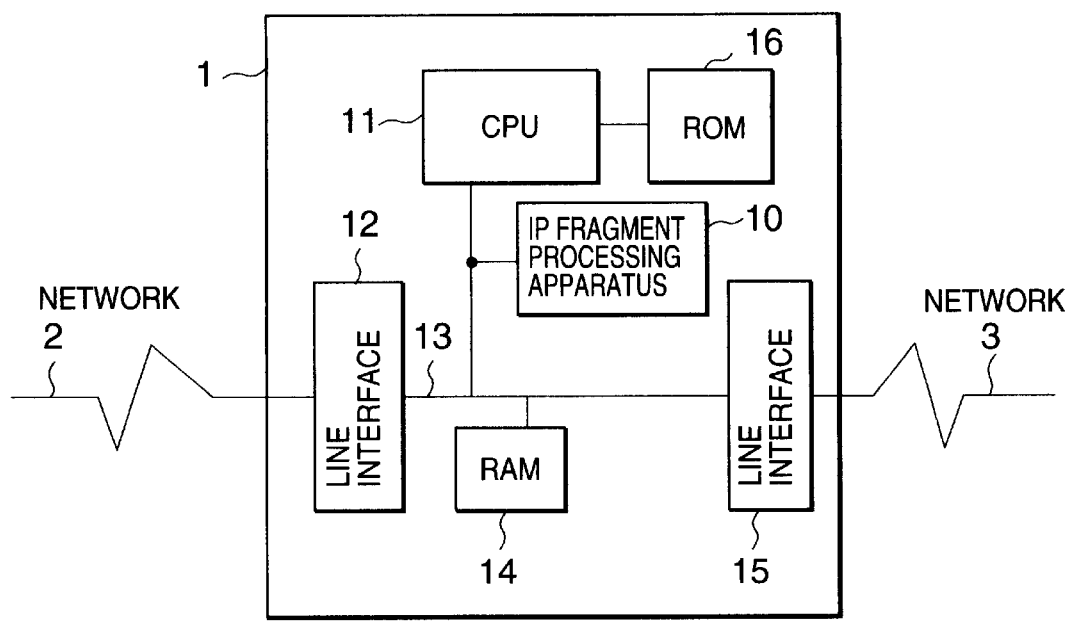
FIG. 1 is a block diagram showing a router apparatus for performing an IP fragmentation process according to an embodiment of the present invention.

In FIG. 1, a router 1 routes IP packets sent between a network 2 and a network 3. The router 1 comprises an IP fragment-processing apparatus 10, a CPU 11, a line interface 12, a line interface 15, RAM 14 and ROM 16 storing a program.

The CPU 11 has read/write access to the RAM 14 through a bus 13, can instruct the line interface 12 to send/receive data through the bus 13, and can also instruct the line interface 15 to send/receive data in the same way. Furthermore, the CPU 11 controls the IP fragment-processing apparatus 10 to generate the IP header. The line interface 12 is connected directly to the network 2, and enables transmission and reception of a packet and enables at this time a DMA transfer through the bus 13. The line interface 15 is connected directly to the network 3, and enables transmission and reception of a packet and enables at this time a DMA transfer through the bus 13.

ROM 16 constitutes an example of a recording medium storing a program according to the present invention. In this recording medium, a program for performing an arithmetic process of a circuit of FIG. 2 described later is stored. As this recording medium, a semiconductor memory device, an optical disk, a magneto-optical disk, a magnetic storage medium and the like can be used.

Figure 2:
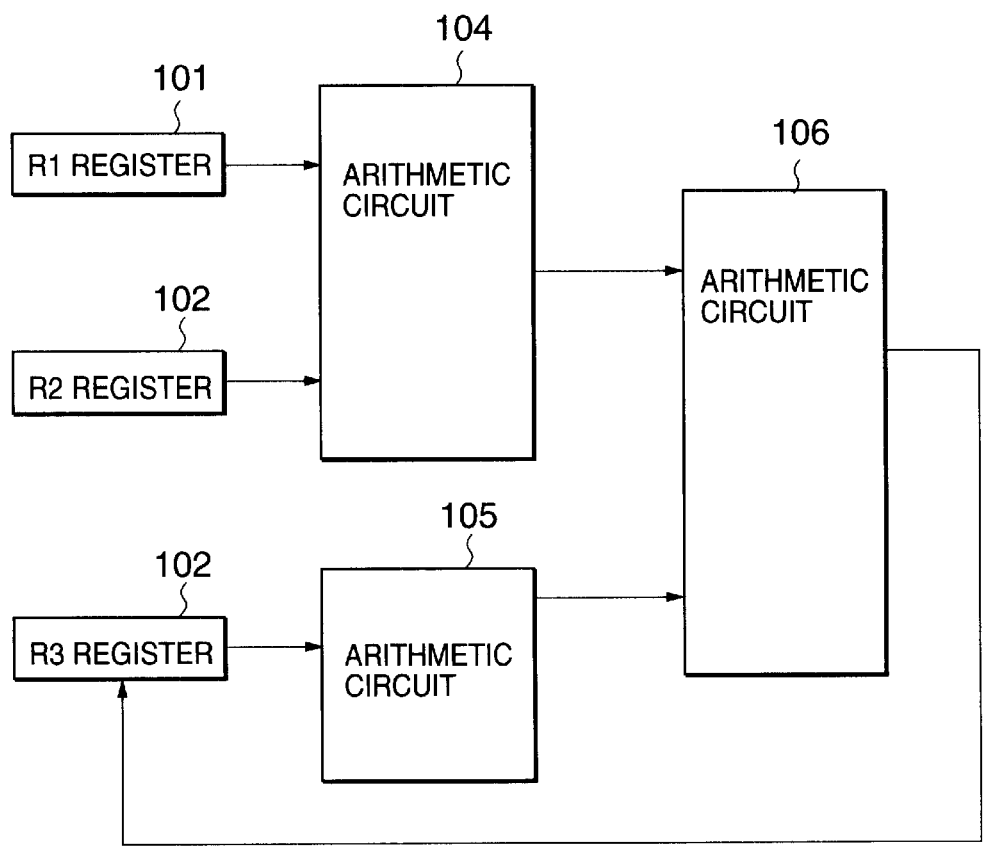
FIG. 2 is a block diagram showing an IP fragment-processing apparatus.

Suppose that the network 2 can transmit an IP packet of a maximum of 1000 octets, and the network 3 can transmit an IP packet of a maximum of 324 octets. The transmission capacity of the network 3 is therefore different from that of the network 2. If an IP packet is transmitted from the network 2 to the network 3, therefore, an IP fragmentation process needs to be performed. FIG. 2 is a block diagram showing in hardware composition an IP fragment-processing apparatus 10 for performing a checksum recalculation process of an IP header with one software instruction according to an embodiment of the present invention. In FIG. 2, an R1 register 101, an R2 register 102 and an R3 register 103 are each a 64-bit register capable of being controlled by software.

An arithmetic circuit 104 reads and calculates the contents of the R1 register 101 and the R2 register 102, and introduces a result of arithmetic operation to an arithmetic circuit 106. An arithmetic circuit 105 reads and calculates the content of the R3 register 103, and introduces a result of arithmetic operation to the arithmetic circuit 106. The arithmetic circuit 106 performs an arithmetic operation taking as input the outputs of the arithmetic circuits 104 and 105, and introduces a result into the register R3. It is assumed that a software instruction at this time is represented by the following mnemonic code:

hcsum R1, R2, R3

The operation of this embodiment will now be described. It is assumed that an IP packet of 920 octets in data length is sent from the network 2 to the network 3 in a format shown in FIG. 3.

Figure 3:
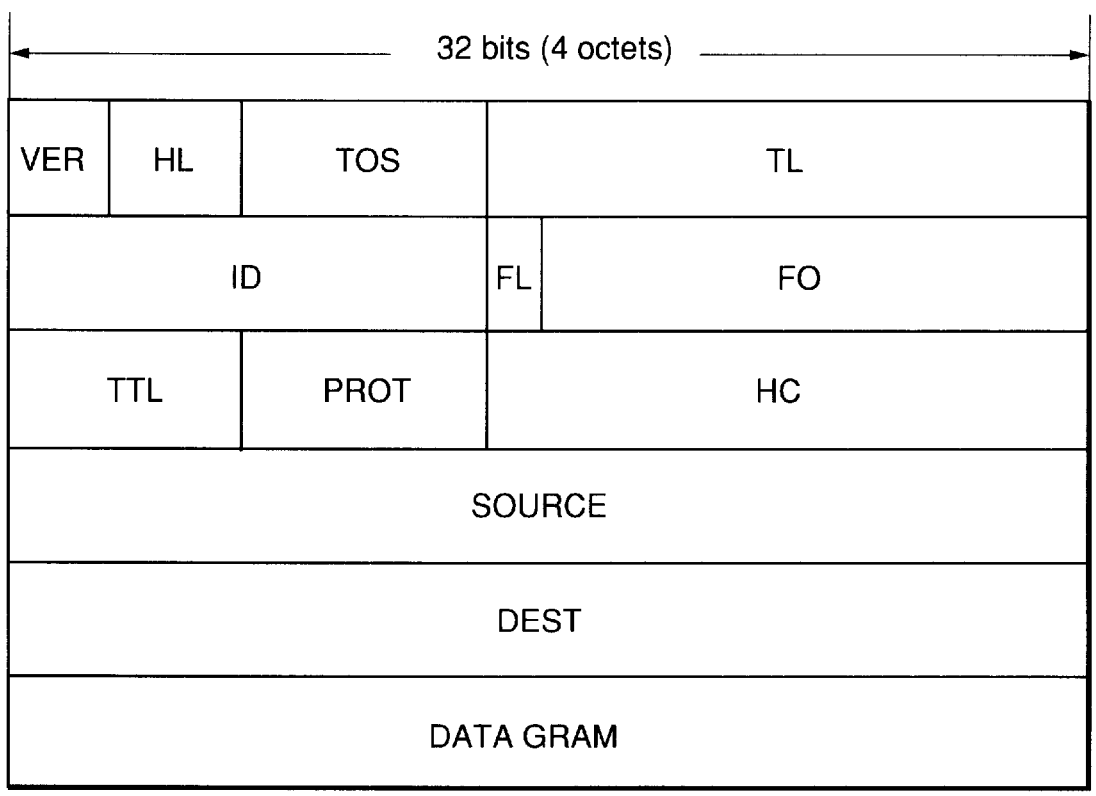
FIG. 3 is a composition diagram showing the format of an IP packet.

It is assumed that the respective values of the IP header of an original IP packet from the network 2 in FIG. 3 are as follows:

VER=4

HL=5

TOS=30 (Hex)

TL=398 (Hex)

ID=9010 (Hex)

FL=0

OF=0

TTL=FF (Hex)

PROT=08 (Hex)

HC=231A

SOURCE=01010101 (Hex)

DEST=01010201 (Hex)

Since an IP packet of a maximum of only 324 octets can be transmitted to the network 3, an IP fragmentation process needs to be performed. As a result of IP-fragment-processing, the IP packet of 920 octets is divided into two packets each having 324 octets and one packet of 312 octets.

At this time, for example, the IP header of the second divided IP packet of 324 octets can unambiguously the following portions except TTL and HC:

VER=4

HL=5

TOS=30 (Hex)

TL=144 (Hex)

ID=9010 (Hex)

FL=010 (Binary)

OF=26 (Hex)

PROT=08 (Hex)

SOURCE=01010101 (Hex)

DEST=01010201 (Hex)

The first IP packet of 324 octets and the IP packet of 312 octets can also convey their respective values in the same way. Therefore, only the values of TTL and HC in each of these packets need to be recalculated.

Figure 4:
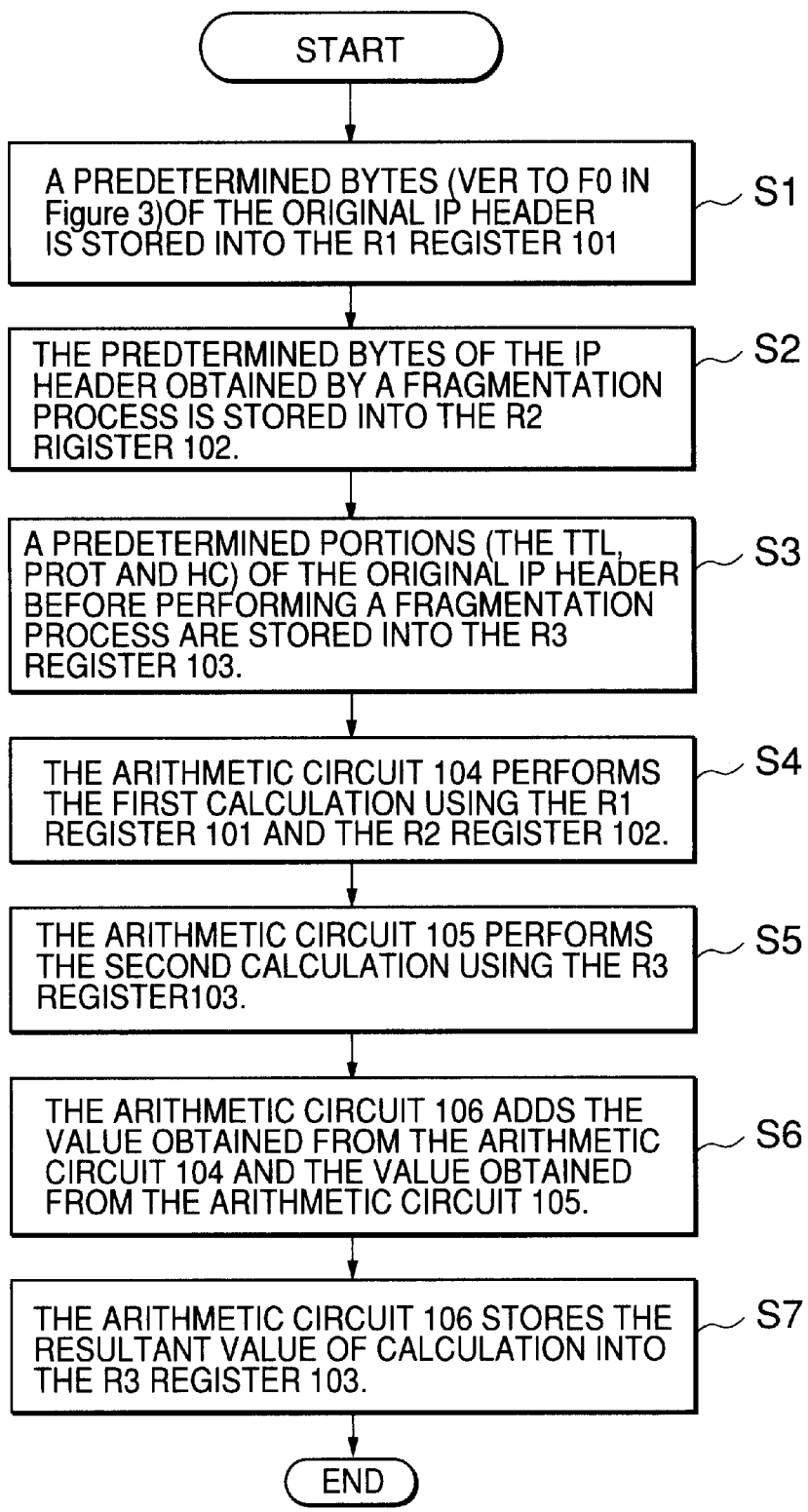
FIG. 4 is a flowchart showing an operation processed by IP-fragment-processing.

Referring to FIG. 4, in the present invention, the first 8 bytes (VER to FO in FIG. 3) of the original IP header (before performing a fragmentation process) are first registered into the R1 register 101 (S1 in FIG. 4). Therefore, the content of the R1 register 101 becomes 4530039890100000 (Hex).

Next, after a fragmentation process, the first 8 bytes of the unambiguous content (all fields except TTL, PROT and HC) of the IP header of the second of the three smaller packets is registered into the R2 register 102 (S2). Therefore, the content of the R2 register 102 becomes 4530014490104026 (Hex).

The TTL, PROT and HC portions of the original IP header (before performing fragmentation) are then registered into the R3 register 103 (S3). Therefore, the content of the R3 register 103 becomes FF08231A (Hex).

After the above-mentioned respective values are registered into the respective registers, the following software instruction is performed:

hcsum R1, R2, R3.

At this time, the arithmetic circuit 104 performs the following calculation using the R1 register 101 and the R2 register 102, and outputs a result to the arithmetic circuit 106 (where the hexadecimal notation system is used) (S4).

(1) 398 (the value of TTL before fragment-processing)—144 (the value of TTL after fragment-processing)—4026 (the FL and FO value after fragment-processing)=C22E.

At this time, since a digit reduction occurs, C22D obtained by further subtracting 1 is outputted from the arithmetic circuit 104.

(2) The arithmetic circuit 105 performs the following calculation using the R3 register 103, and outputs the result to the arithmetic circuit 106 (S5). Since the router apparatus 1 performs a routing operation at one time, 1 is subtracted from the value of TTL. In response to this, 0100 (Hex) is added to the value of HC (if a carry occurs at this time, its portion is added). The TTL, PROT and HC values as changed by the calculation, namely, FF08241A (Hex) is outputted to the arithmetic circuit 106.

(3) The arithmetic circuit 106 adds C22D obtained from the arithmetic circuit 104 and the value of HC obtained from the arithmetic circuit 105 to each other (S6). A new HC value obtained as the result becomes:

C22D+241A=E647 (Hex).

The arithmetic circuit 106 outputs this resultant value of calculation FE08E647 and introduces this into the R3 register 103 (S7). This new value is then used to form the IP header of a regenerated and divided IP packet, which is then transmitted as a signal to the reception side.

As described above, in a checksum recalculation process at the time of an IP fragmentation process, a first register receives the first 8 bytes of an original IP header, a second register receives the first 8 bytes of the IP header including updated TL, FO and FL values obtained as a result of an IP fragmentation process, and a third register receives the 4 bytes on and after the 9th byte of the IP header including the TTL and HC values of the original IP header. Furthermore, the present invention calculates a difference (in units of 16 bits) between the first and second registers, next subtracts 1 from the TTL value obtained from the third register, adds the HC value as this portion to obtain a new HC value, adds, if a digit overflow occurs, this digit-overflow portion to the new HC value, subtracts, if a digit reduction occurs, this digit-reduction portion from the new HC value, and introduces into the third register a new HC obtained as the result and a TTL value obtained by the subtraction.

In this embodiment, the first and second registers receives the first 8 bytes of an IP header. However, it can be changed such that the first register receives only TL value and the second register receives TL, FL and FO values.

This embodiment uses a 64-bit register as a register for arithmetic operation, but may use a set of plural registers using a 32-bit processor.

Furthermore, while this embodiment writes back a result of calculation to the original R3 register, if instead it were to write back to another fourth register, it could successively perform the next process while keeping the original TTL and HC values on a register.

According to the present invention, as described above, since a checksum recalculation process at the time of an IP fragmentation process, which heretofore required a plurality of software instructions, can be processed by one software instruction, it is possible to improve the processing performance of an IP fragmentation process.

Although the preferred embodiments of the present invention have been described in detail, it should be understood that various changes, substitutions and alterations could be made therein without departing from the spirit and scope of the inventions as defined by the appended claims.

What is claimed is:

1. An IP fragment-processing apparatus comprising:
   a first register which receives predetermined bytes of an IP header of an original IP packet;
   a second register which receives predetermined bytes of the IP header of a packet which is obtained by dividing said original IP packet;
   a third register which receives first and second portions of the IP header of said original IP packet;
   a first arithmetic unit which subtracts third, fourth and fifth portions of said predetermined bytes received in said second register from a third portion of said predetermined bytes received in said first register;
   a second arithmetic unit which subtracts a predetermined value from said first portion and recalculates the second portion corresponding to a change of said first portion; and
   a third arithmetic unit which generates a new second portion by adding a result of an arithmetic operation of said first arithmetic unit and the second portion obtained by said second arithmetic unit to each other.

2. The IP fragment-processing apparatus according to claim 1, wherein said predetermined bytes received in said first register is 8 bytes; said first portion is Time To Live field; said second portion is a Header Checksum field; said third portion is a Total Length field; said fourth portion is Flag Field value; and said fifth portion is a Fragment Offset field.

3. The IP fragment-processing apparatus according to claim 2, wherein said second arithmetic unit adds a predetermined value to a result of its recalculation, if a carry occurs in recalculating the second portion.

4. The IP fragment-processing apparatus according to claim 1, wherein said new second portion obtained by said third arithmetic unit is stored into said third register.

5. The IP fragment-processing apparatus according to claim 1, further comprising:
   a fourth register which receives said new second portion obtained by said third arithmetic unit.

6. The IP fragment-processing apparatus according to claim 1, wherein said first arithmetic unit subtracts a predetermined value from a result of its previous subtraction, if a digit reduction occurs.

7. An IP fragment-processing apparatus comprising:
   a first register which receives a first portion of an IP header of an original IP packet,
   a second register which receives second portion of an IP header of a packet which is obtained by dividing said original IP packet,
   a third register which receives third and fourth portions of the IP header of said original IP packet,
   a first arithmetic unit which subtracts values of said second portions from said first portion,
   a second arithmetic unit which subtracts a predetermined value from the third portion and recalculates the fourth portion corresponding to a change of said third portion, and
   a third arithmetic unit which generates a new fourth portion by adding a result of an arithmetic operation of said first arithmetic unit and the fourth portion obtained by said second arithmetic unit.

8. The IP fragment-processing apparatus according to claim 7, wherein said first arithmetic unit subtracts a predetermined value from a result of its previous subtraction, if a digit reduction occurs.

9. The IP fragment-processing apparatus according to claim 8, wherein said second arithmetic unit adds a predetermined value to a result of its recalculation, if a carry occurs in recalculating the fourth portion.

10. The IP fragment-processing apparatus according to claim 7, wherein said first portion is a Total Length field; said second portion are Total Length, Flag Field and Flagment Offset field; said third portion is a Time To Live field; and said fourth portion is Header Checksum field.

11. An IP fragment-processing method comprising:
    storing a first portion of an IP header of an original IP packet;
    storing second portions of an IP header of a packet which is obtained by dividing said original IP packet;
    storing third and fourth portions of the IP header of said original IP packet;
    subtracting said second portions from said first portion;
    subtracting a predetermined value from the third portion;
    recalculating the fourth portion corresponding to a change of said third portion; and
    generating a new fourth portion by adding (a) a result of subtracting said second portion from said first portion and (b) the fourth portion obtained by said recalculating.

12. The IP fragment-processing method according to claim 11, further comprising:
    introducing said new fourth portion into a register used in said storing third and fourth portions.

13. The IP fragment-processing method according to claim 11, further comprising:
    introducing said new fourth portion into a register other than a register used in said storing third and fourth portions.

14. The IP fragment-processing method according to claim 11, further comprising regenerating and transmitting a divided IP packet whose IP header comprises said new fourth portion.

15. A computer-readable medium having data structures stored therein, said data structures, when executed by a computer, being a program causing said computer to perform the following steps:
    (a) storing a first portion of a header of an original IP packet;
    (b) storing second portions of an IP header of a packet that is obtained by dividing said original IP packet;
    (c) storing third and fourth portions of the IP header of said original IP packet;
    (d) subtracting said second portions from said first portion;
    (e) subtracting a predetermined value from said third portion and recalculating the fourth portion corresponding to a change of said third portion; and
    (f) generating a new fourth portion by adding the result of step (d) to the result of step (e).

16. The computer-readable medium of claim 15, wherein said data structures further cause the computer to regenerate and transmit a divided IP packet whose IP header comprises said new fourth portion.

* * * * *